US009004251B2

(12) United States Patent
Ikegawa

(10) Patent No.: US 9,004,251 B2
(45) Date of Patent: Apr. 14, 2015

(54) ELECTROMAGNETIC CLUTCH

(71) Applicant: Aisin Seiki Kabushiki Kaisha, Kariya-shi (JP)

(72) Inventor: Atsutoshi Ikegawa, Paris (FR)

(73) Assignee: Aisin Seiki Kaubushiki Kaisha, Kariya-Shi, Aichi-Ken (JP)

( * ) Notice: Subject to any disclaimer, the term of this patent is extended or adjusted under 35 U.S.C. 154(b) by 198 days.

(21) Appl. No.: 13/670,956

(22) Filed: Nov. 7, 2012

(65) Prior Publication Data

US 2013/0112523 A1 May 9, 2013

(30) Foreign Application Priority Data

Nov. 9, 2011 (JP) ................................. 2011-245824
Nov. 9, 2011 (JP) ................................. 2011-245825

(51) Int. Cl.
*F16D 27/105* (2006.01)
*F16D 27/14* (2006.01)

(52) U.S. Cl.
CPC .............. *F16D 27/14* (2013.01); *F16D 27/105* (2013.01)

(58) Field of Classification Search
CPC ................................ F16D 27/105; F16D 13/08
USPC ...................................................... 192/84.81
See application file for complete search history.

(56) References Cited

U.S. PATENT DOCUMENTS 2,808,917 A   10/1957  Harter
3,006,448 A * 10/1961  Fox .............................. 192/81 C
3,762,522 A   10/1973  Kirschling
5,967,274 A   10/1999  Leone et al.
5,996,759 A   12/1999  Aoki et al.
6,581,743 B2   6/2003  Moroi et al.

(Continued)

FOREIGN PATENT DOCUMENTS

DE    198 38 440 A1    3/1999
JP    11-201191 A      7/1999
JP    2001-317565 A   11/2001

OTHER PUBLICATIONS

Extended European Search Report dated Feb. 20, 2013, issued by the European Patent Office in the corresponding European Application No. 12191145.7. (4 pages).

*Primary Examiner* — Richard Lorence
(74) *Attorney, Agent, or Firm* — Buchanan Ingersoll & Rooney PC

(57) ABSTRACT

An electromagnetic clutch includes a wrap spring being wound around to be in a pressure bonding state relative to an outer peripheral surface of a tubular portion of a driving-side rotation member. A first end of the wrap spring connects to a driving arm of a driving member, which connects to a driven-side rotation member. A second end of the wrap spring connects to a rim portion of an operating member formed in a disc form. The operating member is rotatable relative to the driven-side rotation member about the rotation axis as the center and movable along the rotation axis. After a rotation of the operating member is restrained, the driving member is restrained from rotation, which operates the wrap spring to twist and cancels the pressure boding state of the wrap spring relative to the driving-side rotation member, which in turn provides a power cutoff state.

16 Claims, 9 Drawing Sheets

(56) References Cited

U.S. PATENT DOCUMENTS

| | | | |
|---|---|---|---|
| 8,182,382 B2* | 5/2012 | Riu | 474/166 |
| 2008/0041686 A1 | 2/2008 | Hoshino et al. | |
| 2010/0122882 A1 | 5/2010 | Komorowski et al. | |
| 2010/0230227 A1 | 9/2010 | Parsons et al. | |
| 2011/0236230 A1* | 9/2011 | Ikegawa et al. | 417/316 |
| 2013/0313068 A1* | 11/2013 | Mevissen et al. | 192/81 C |
| 2013/0341150 A1* | 12/2013 | Ikegawa | 192/80 |
| 2013/0341151 A1* | 12/2013 | Ikegawa | 192/84.81 |

* cited by examiner

ELECTROMAGNETIC CLUTCH

CROSS REFERENCE TO RELATED APPLICATIONS

This application is based on and claims priority under 35 U.S.C. §119 to Japanese Patent Application 2011-245824, filed on Nov. 9, 2011 and to Japanese Patent Application 2011-245825, filed on Nov. 9, 2011 the entire content of which are incorporated herein by reference.

TECHNICAL FIELD

This disclosure generally relates to an electromagnetic clutch.

BACKGROUND DISCUSSION

An electromagnetic clutch including a driving pulley and a shaft being coaxially arranged and a wrap spring in a coil form having a center at a rotation axis, which connects and disconnects a motive power by changing a winding diameter of the wrap spring, is known. In JPH11-201191A, hereinafter referred to as Reference 1, an electromagnetic clutch similar to the known electromagnetic clutch is disclosed. In the electromagnetic clutch disclosed in Reference 1, an input hub and an output hub in rotatable states arranged coaxial to a rotation axis are provided at adjacent positions to each other along the rotation axis. A wrap spring is arranged at an outer periphery of the input hub and an outer periphery of the output hub. A control collar is arranged around the wrap spring. One end of the wrap spring is retained at the input hub and the other end of the wrap spring is retained at the control collar.

According to the electromagnetic clutch disclosed in Reference 1, the clutch is disconnected while a magnetic force is not acting on an armature provided on the control collar. In the state where the clutch is disconnected, the armature is retained at a predetermined position by a biasing force of a return spring so that the wrap spring is detached from the outer periphery of the input hub and the outer periphery of the output hub. In the state where the magnetic force is acting on the armature provided on the control collar, the magnetic force attracts the armature and pulls the armature in a direction of a magnetic solenoid against the biasing force of the return spring so that a rotational force of the control collar is transmitted to the output hub. Accordingly, the wrap spring is brought to a state where the winding diameter of the wrap spring is reduced which in turn results in the wrap spring in a pressure bonding state relative to the outer periphery of the input hub and the outer periphery of the output hub and provides a state where the electromagnetic clutch is connected, which is a state where the rotational driving power from the input hub is transmitted to the output hub.

In JP2001-317565A, hereinafter referred to as Reference 2, an electromagnetic clutch including a wrap spring provided over a span of and arranged around an outer periphery of a driving pulley and an outer periphery of an output hub that integrally rotates with a shaft is disclosed. The driving pulley is referred to as an input pulley and the shaft is referred to as a pump shaft in Reference 2. One end of the wrap spring is retained at an armature and the other end of the wrap spring is retained at the output hub. An electromagnetic solenoid, which provides an attraction force acting on the armature, is arranged at an inwardly position relative to the driving pulley.

In a state where a magnetic force from the electromagnetic solenoid is not acting on the armature, the electromagnetic clutch disclosed in Reference 2 is in a disconnected state, which is a state where the wrap spring is detached from the outer periphery of the input pulley and the outer periphery of the output hub. In a state where the electromagnetic solenoid is activated, the magnetic force from the electromagnetic solenoid attracts the armature toward the electromagnetic solenoid, which in turn results in attaching the wrap spring firmly over the span of the outer periphery of the input pulley and the outer periphery of the output hub and provides a state where the electromagnetic clutch is connected, which is a state where the driving power from the driving pulley is transmitted to the shaft.

As Reference 1 and Reference 2 describe, in the electromagnetic clutches providing a power transmission state initiated by supplying power to the electromagnetic solenoid, a continuous electric power supply is required in order to transmit motive power. As a result, excessive electricity is consumed by the electromagnetic clutch in a situation where the electromagnetic clutch is applied to a portion, for example, to a water pump for an engine, where the power transmission state, or the state where the electromagnetic clutch is in the connected state, continues for a long period of time. The electromagnetic clutch that maintains the power transmission state by continuously supplying electricity requires a large size electromagnetic solenoid for providing adequate magnetic flux in order to maintain a reliable power transmission state even in a state where the magnetic flux decreases when the temperature rises. Using the large size electromagnetic solenoid leads to a cost increase. The water pump provided with the electromagnetic clutch does not function appropriately when the power supply is discontinued due to a malfunctioning, which leads to an overheating of the engine.

The arrangement of the electromagnetic clutch described in Reference 1 is formed with an air gap at a portion in a magnetic circuit formed between the electromagnetic solenoid and the armature, which more specifically is at a portion between a rotor that rotates by connecting to the output hub and the electromagnetic coil in a fixed state. The air gap leads to an increase in an amount of electricity the electromagnetic solenoid requires. Furthermore, the input hub and the output hub are arranged adjacently to each other in the electromagnetic clutch described in Reference 1. Accordingly, the input hub and the output hub may unintentionally rotate together even in a state where the electromagnetic solenoid is not activated depending on an attitude of the wrap spring or a condition of a contact state between the wrap spring and the output hub.

Similarly, the arrangement of the electromagnetic clutch described in Reference 2 may require a powerful electromagnetic solenoid because of an air gap available even in a connected state of the electromagnetic clutch at a portion in a magnetic circuit formed between the electromagnetic solenoid and the armature, which more specifically is at a portion between the input pulley in a rotating state and the electromagnetic solenoid in a fixed state.

Switching swiftly between the connected state and the disconnected state is favorable in an electromagnetic clutch that connects and disconnects a driving power from a driving-side rotation member to a driven-side rotation member.

A need thus exists for an electromagnetic clutch, which is not susceptible to the drawback mentioned above.

SUMMARY

An electromagnetic clutch includes a driving-side rotation member rotating about a rotation axis as a center by receiving a driving force, a driven-side rotation member coaxially arranged with the rotation axis, a wrap spring being wound around to be in a pressure bonding state relative to the driving-side rotation member in a normal state, a driving member fixed to the driven-side rotation member, connected with a first end of the wrap spring, an operating member made from a magnetic body rotatable relative to the driven-side rotation member about the rotation axis as the center, movable along the rotation axis, including a disc form member formed in a disc form provided with a rim portion where a second end of the wrap spring connects to, and an electromagnetic solenoid configured to generate a magnetic force attracting and retaining the operating member. At a time at which electricity is supplied to the electromagnetic solenoid, which in turn attracts and retains the operating member to the electromagnetic solenoid, the driving member rotates relative to the operating member by a frictional force generated between the driving member and the driving-side rotation member or by inertia, which in turn cancels the wrap spring from the pressure boding state relative to the driving-side rotation member to disconnect power transmission from the driving-side rotation member to the driven-side rotation member.

An electromagnetic clutch includes a driving-side rotation member rotating about a rotation axis as a center by receiving a driving force, a driven-side rotation member coaxially arranged with the rotation axis, a wrap spring being wound around to be in a pressure bonding state relative to the driving-side rotation member in a normal state, a driving member fixed to the driven-side rotation member connected with a first end of the wrap spring, an operating member made from a magnetic body in a state where a second end of the wrap spring is connected, rotatable relative to the driven-side rotation member with the rotation axis as the center and movable along the rotation axis, an electromagnetic solenoid configured to generate a magnetic force attracting and retaining the operating member, and a spring retaining portion provided on the driving member configured to retain the wrap spring in a state where the wrap spring is pressed against the spring retaining portion while the operating member is attracted to contact and retained to the electromagnetic solenoid. At a time at which electricity is supplied to the electromagnetic solenoid, which in turn attracts and retains the operating member to the electromagnetic solenoid, the driving member rotates relative to the operating member by a frictional force generated between the driving member and the driving-side rotation member or by inertia, which in turn cancels the wrap spring from the pressure boding state relative to the driving-side rotation member to disconnect power transmission from the driving-side rotation member to the driven-side rotation member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
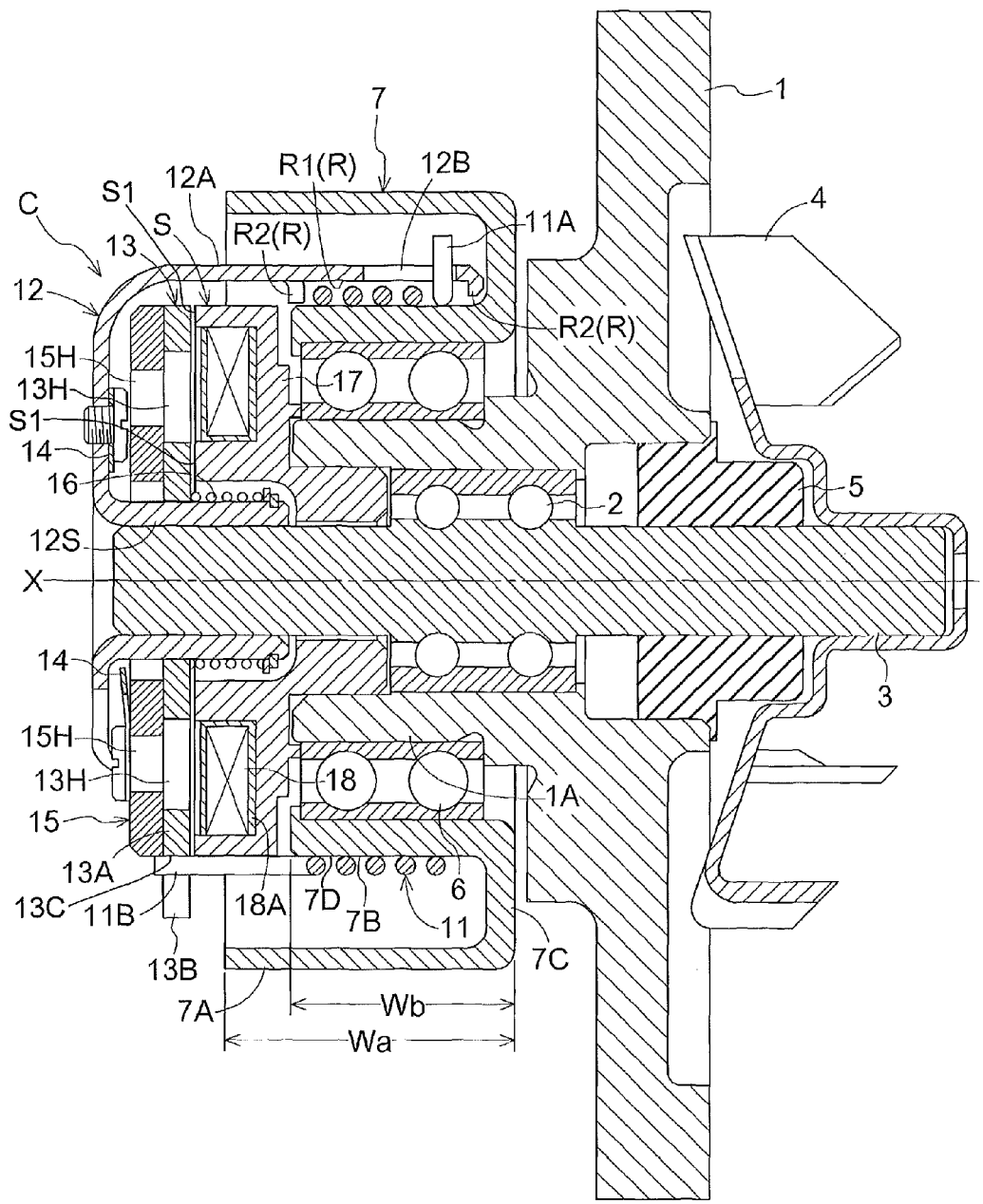
FIG. 1 is a cross sectional view of a water pump provided with an electromagnetic clutch according to a first embodiment.
Figure 2:
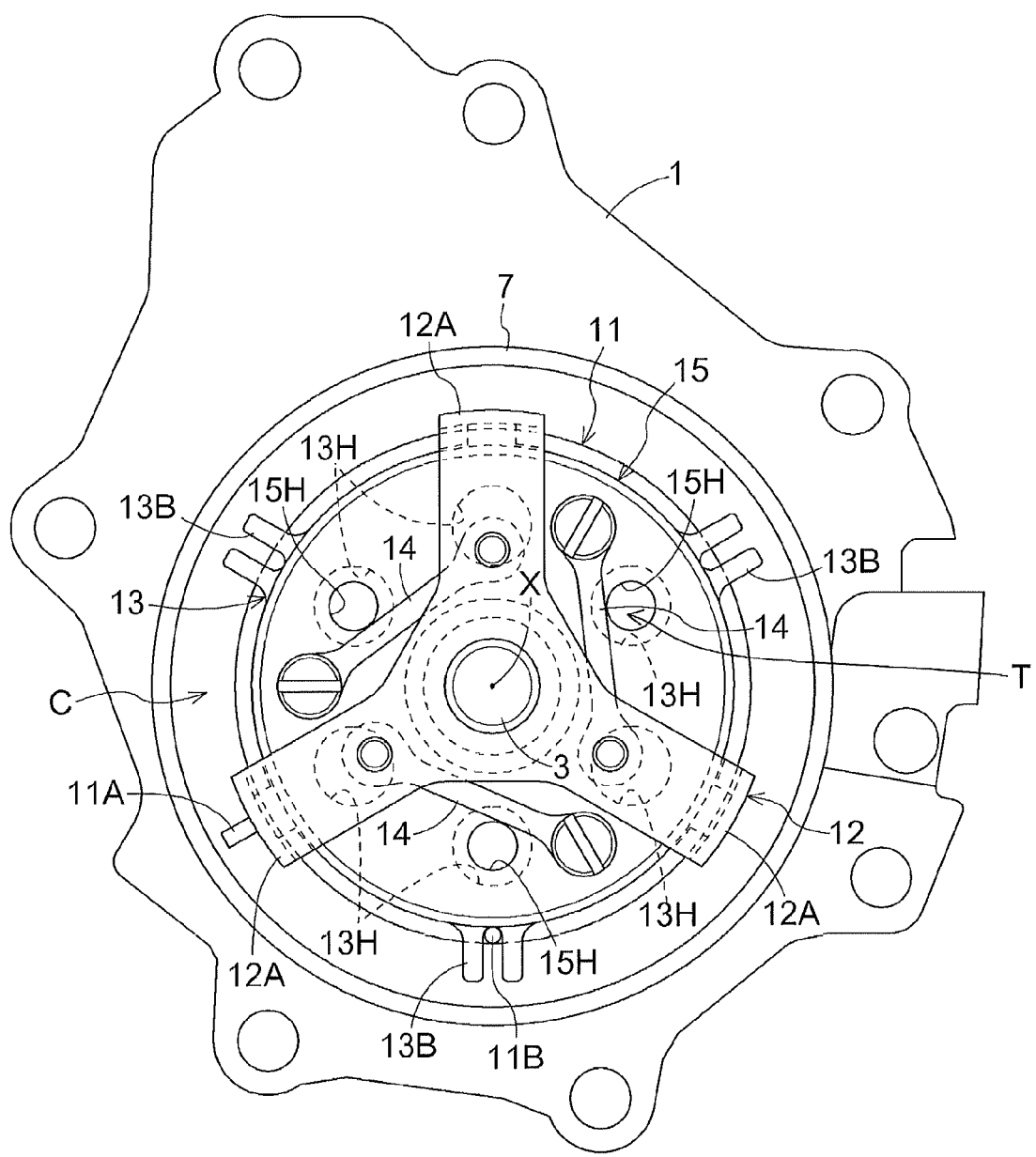
FIG. 2 is a front view illustrating a configuration of the electromagnetic clutch according to the first embodiment.
Figure 3:
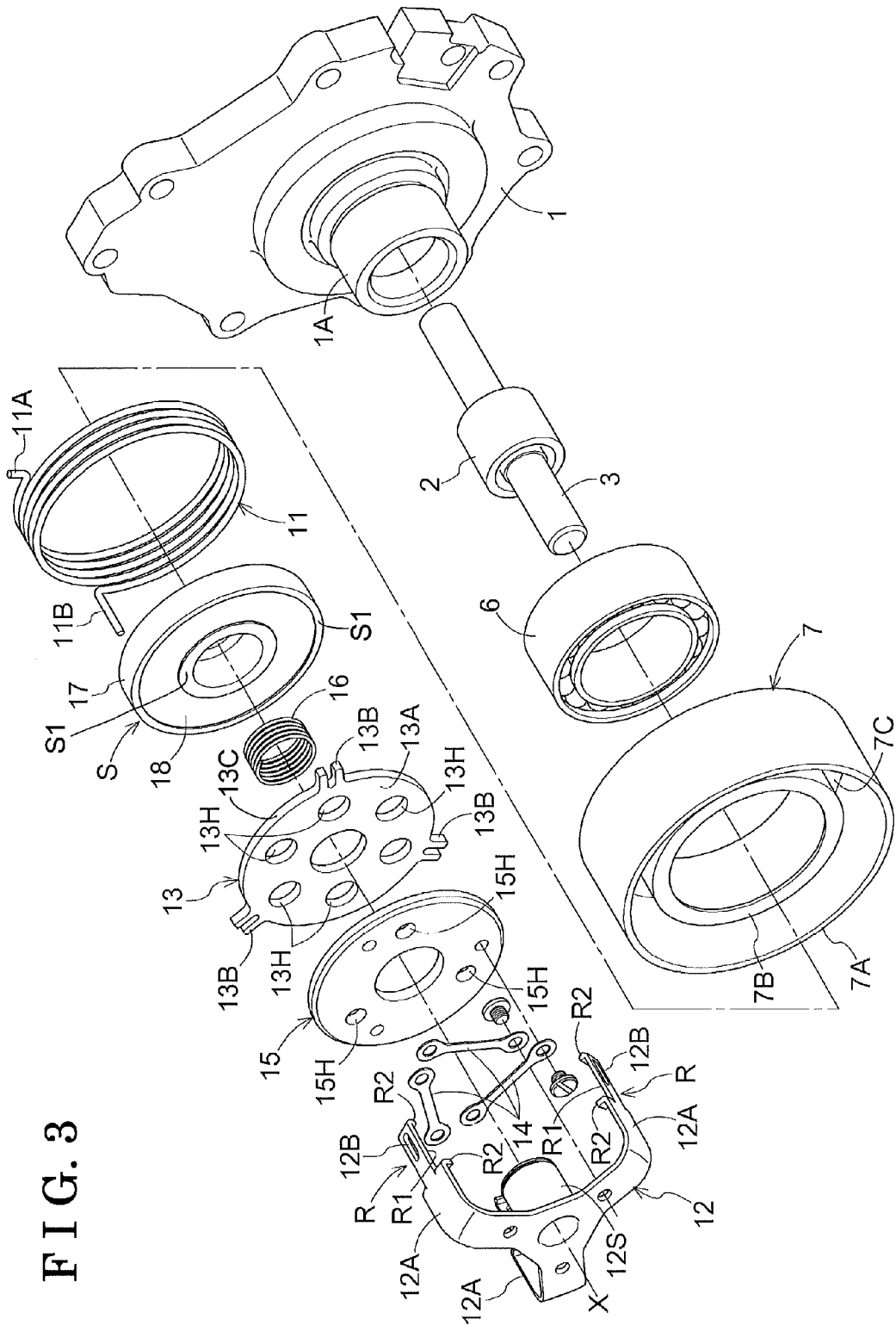
FIG. 3 is an exploded perspective view of the electromagnetic clutch according to the first embodiment.

An electromagnetic clutch C according to a first embodiment will be described referring to drawings. FIGS. 1 to 3 illustrate a water pump that may transmit or cut off motive power through an operation of the electromagnetic clutch C according to the first embodiment. The water pump includes a pump housing 1, which is a static system. The water pump also includes a shaft 3, which serves as a driven-side rotation member, rotationally supported to the pump housing 1 via a shaft bearing 2 with a center of rotation at a rotation axis X. An impeller 4 is arranged at an inward end of the shaft 3. A seal 5 is provided between the shaft 3 and the pump housing 1. The water pump further includes a driving pulley 7 that freely rotates about the rotation axis X via a pulley bearing 6 relative to a boss form portion 1A of the pump housing 1. The electromagnetic clutch C is configured to switch a state between a power transmission state and a power cutoff state. The power transmission state is a state where a rotational driving power from the driving pulley 7 is transmitted to the shaft 3, which is a state where the clutch is connected. The power cutoff state is a state where the rotational driving power from the driving pulley 7 is cut off, which is a state where the clutch is disconnected.

The driving pulley 7, which serves as the driving-side rotation member, is integrally formed and includes a belt winding portion 7A formed at an outer peripheral portion of the driving pulley 7 and formed in a tubular form, a tubular portion 7B formed at a central position of a space surrounded by the belt winding portion 7A, which is the space in an inward direction relative to an inner peripheral surface of the belt winding portion 7A, and a side wall portion 7C arranged in a direction of the pump housing 1 connecting the belt winding portion 7A and the tubular portion 7B. The tubular portion 7B is provided with a tube length Wb, which is a measurement taken in a direction that conforms to the rotation axis X, having a length shorter than a peripheral width Wa, which is a measurement taken on the belt winding portion 7A in the direction that conforms to the rotation axis X, so that the tubular portion 7B is accommodated in an internal space of the belt winding portion 7A. The tubular portion 7B fits to an outward portion of the pulley bearing 6, which is where the driving pulley 7 is rotationally supported to the pump housing 1.

The driving pulley 7 is a type of driving pulley using a flat belt. Nevertheless, a V-belt may be used for the driving pulley 7 and a surface at an outer periphery of the driving pulley 7 may be provided with V-shaped grooves accordingly. Furthermore, a surface at an outer periphery of the driving pulley 7 may be provided with gear form recesses and protrusions for using a timing belt.

An endless belt is entrained around an output pulley provided at an output shaft of an engine and the driving pulley 7 so that the driving pulley 7 is constantly driven. The electromagnetic clutch C is controlled by a control device that receives a result detected by a temperature sensor detecting a temperature of cooling water. The control device maintains the electromagnetic clutch C in the power cutoff state in a situation where the control device determines the temperature of the cooling water is low, which is similar to a condition immediately after the engine start, which in other words is a condition where warming of the engine is insufficient, in order to further warm the engine. The control device brings the electromagnetic clutch C to the power transmission state in a situation where the control device determines the temperature of the cooling water is increased to an appropriate temperature, which in turn activates a control for circulating the cooling water by driving the impeller 4.

The electromagnetic clutch C according to the first embodiment is further described next. The electromagnetic clutch C includes a wrap spring 11 formed in a coil form, which is accommodated in an internal space of the driving pulley 7, a driving member 12, an operating member 13, which serves as an armature, an intermediate member 15, and an electromagnetic solenoid S, which attracts the operating member 13 to come into contact with the electromagnetic solenoid S by applying an attraction force on the operating member 13.

A yoke 17 made from a magnetic body formed in an annular form made of iron, nickel alloy, or a similar material is installed securely to the boss form portion 1A of the pump housing 1. The yoke 17 is formed with a recessed portion in an annular form having a center at the rotation axis X that opens in an opposite direction to where the impeller 4 is provided. A coil 18 with a copper wire wound on a bobbin 18A is inserted into the recessed portion so that the electromagnetic solenoid S is formed. The electromagnetic solenoid S is formed with contact surfaces S1, each of which is provided with a ring form area having a center at the rotation axis X, at portions radially inward of and outward of the recessed portion where the coil 18 is inserted into.

The wrap spring 11 is formed in the coil form by forming a spring steel in a spiral. The wrap spring 11 is provided with a winding diameter that makes the wrap spring 11 attach to the outer periphery of the tubular portion 7B of the driving pulley 7 by pressure bonding in a normal state, which is a state where no external force is applied on the wrap spring 11. The wrap spring 11 in a pressure bonding state is arranged such that a central axis of the coil form portion of the wrap spring 11 is coaxial with the rotation axis X. A first end 11A of the wrap spring 11, which is an end of the wrap spring 11 positioned close to the pump housing 1 in an axial direction along the rotation axis X, is bent in a radially outward direction. A second end 11B of the wrap spring 11, which is the other end of the wrap spring 11, is bent outwardly in the axial direction, which is the direction that conforms to the rotation axis X.

A driving member 12 connects to the shaft 3 by fitting a sleeve portion 12S provided with a form having a center of rotation coaxial with the rotation axis X to a front end portion of the shaft 3 so that the driving member 12 integrally rotates with the shaft 3. The driving member 12 includes three driving arms 12A bent from an outer periphery of the driving member 12 and extend in the direction of the pump housing 1 in an attitude that is parallel to the rotation axis X. The wrap spring 11 connects to the driving member 12 in an arrangement where the first end 11A of the wrap spring 11 is inserted into one of slots 12B for engagement formed on each of three driving arms 12A.

The operating member 13 includes a disc form portion 13A having a center of rotation at the rotation axis X made from a magnetic body, made of iron, nickel alloy, or a similar material. The disc form portion 13A serves as a disc form member. Three engaging portions 13B integrally formed with the disc form portion 13A extend about the outer periphery of the disc form portion 13A. Each of the engaging portions 13B is provided with a recessed portion for engagement. The wrap spring 11 and the operating member 13 connect, or engage, in an arrangement where the second end 11B of the wrap spring 11 is inserted into one of the recessed portion for engagement provided on the engaging portions 13B. The disc form portion 13A is provided with a radius that conforms to a radius measured at an outermost periphery of the contact surfaces S1 of the electromagnetic solenoid S. Furthermore, a through-hole portion is formed at a central position of the disc form portion 13A.

The sleeve portion 12S is inserted into the through-hole portion of the operating member 13 so that the operating member 13 is loosely fit and supported to the sleeve portion 12S in a state where the operating member 13 is allowed to rotate relative to the shaft 3 and is movable in the direction that conforms to the rotation axis X. A coil spring 16 is provided to fit around an outer peripheral portion of the sleeve portion 12S. The operating member 13 is biased by a biasing force of the coil spring 16 in a direction such that the operating member 13 is separated from the yoke 17 of the electromagnetic solenoid S.

The intermediate member 15 is a magnetic body made of iron, nickel alloy, or a similar material formed in a disc form having a center of rotation at the rotation axis X. The intermediate member 15 is loosely fit and supported to the sleeve portion 12S in a state where the intermediate member 15 is allowed to rotate relative to the shaft 3 and is movable in the direction that conforms to the rotation axis X. The intermediate member 15 is provided with a radius that conforms to a radius of the contact surfaces S1 of the electromagnetic solenoid S measured at an outermost periphery. The intermediate member 15 is arranged at a position where the intermediate member 15 is sandwiched between the operating member 13 and the driving member 12. The intermediate member 15 connects to the driving member 12 with plate springs 14 installed between the intermediate member 15 and the driving member 12 so that the intermediate member 15 integrally rotate with the driving member 12.

In a state where no external force is applied to the intermediate member 15, the intermediate member 15 is maintained at a position where the intermediate member 15 is in contact with the operating member 13 by the biasing forces of the plate springs 14. In a state where a magnetic attraction force from the operating member 13 is acting on the intermediate member 15, the intermediate member 15 is allowed for a displacement towards the operating member 13 along the rotation axis X by elastic deformations of three plate springs 14.

Three driving arms 12A of the driving member 12 are equally spaced in a circumferential direction between each of the driving arms 12A in order to provide a balanced rotation. Three driving arms 12A are arranged at a position radially outward of the wrap spring 11. Each of the driving arms 12A is provided with a restricting portion R, which serves as a spring retaining portion, which is provided for maintaining the wrap spring 11 in a predetermined attitude while the wrap spring 11 is in a state where the wrap spring 11 is detached from the outer periphery of the tubular portion 7B. More specifically, the driving arms 12A are configured to serve as first restricting portions R1, each of which serves as a first retaining portion, restricting the displacement of the wrap spring 11 in the radially outward direction, which is in a direction in which the wrap spring 11 increases distance from the rotation axis X. Each of the driving arms 12A is formed with a set of protrusions projecting in a direction of the wrap spring 11 or in the direction toward the rotation axis X, which is a protrusion formed at a distal end in an extending direction of the driving arm 12A and a pair of protrusions formed at a middle portion of the driving arm 12A. The set of protrusions are configured to serve as second restricting portions R2, each of which serves as a second retaining portion, restricting the displacement of the wrap spring 11 in the direction that conforms to the rotation axis X.

An outer diameter of the operating member 13 and an outer diameter of the intermediate member 15 is provided with a diameter that conforms to the diameter of the contact surfaces S1 measured at the outermost periphery. Nevertheless, the outer diameter of the operating member 13 and the outer diameter of the intermediate member 15 may be provided with diameters that do not conform to the diameter of the contact surfaces S1 measured at the outermost periphery. Each of the outer diameter of the operating member 13 and the outer diameter of the intermediate member 15 may be provided with a diameter slightly larger or smaller relative to the diameter of the contact surfaces S1 measured at the outermost periphery as long as the magnetic flux from the electromagnetic solenoid S efficiently acts on the operating member 13 and the intermediate member 15.

Figure 4A:
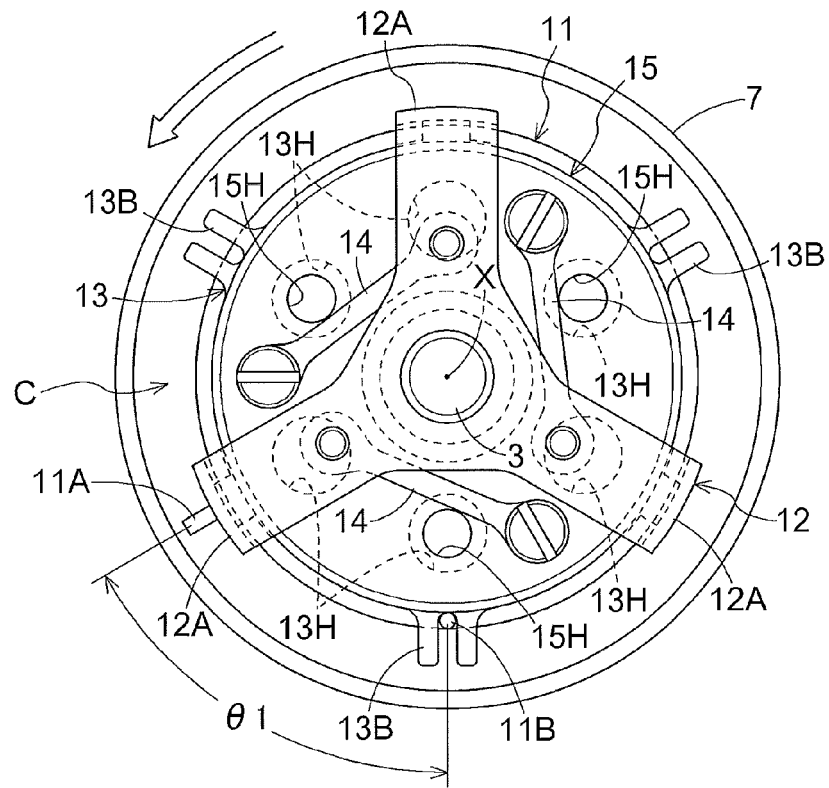
FIG. 4A is a front view of the electromagnetic clutch according to the first embodiment in a power transmission state.
Figure 5A:
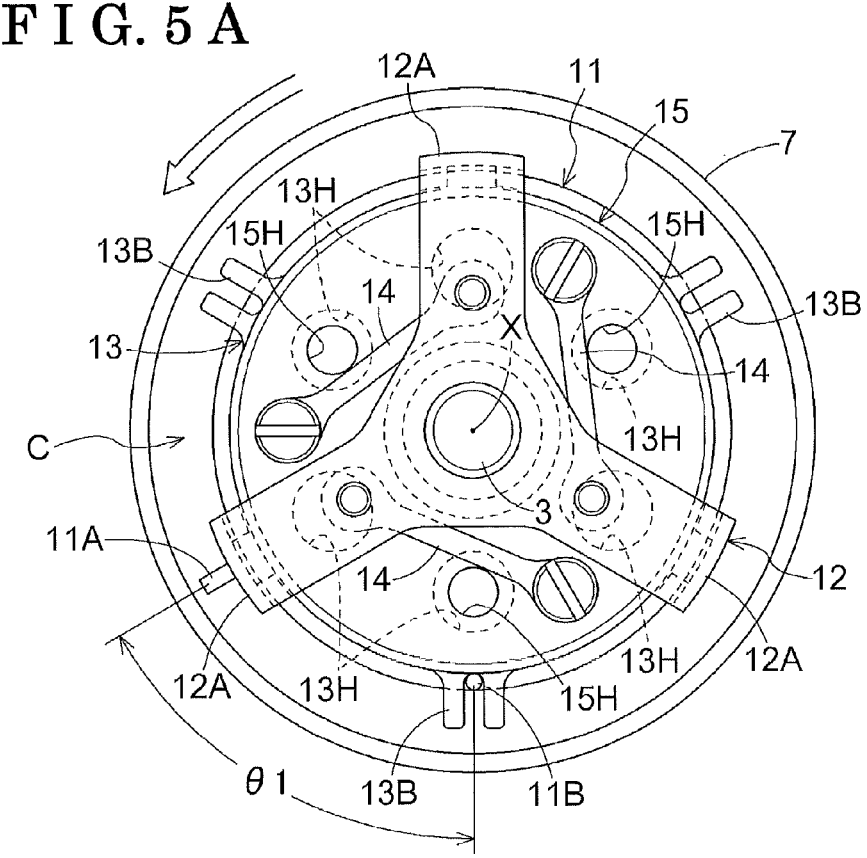
FIG. 5A is a front view of the electromagnetic clutch according to the first embodiment in a state where an operating member is attracted to contact the electromagnetic solenoid.
Figure 6A:
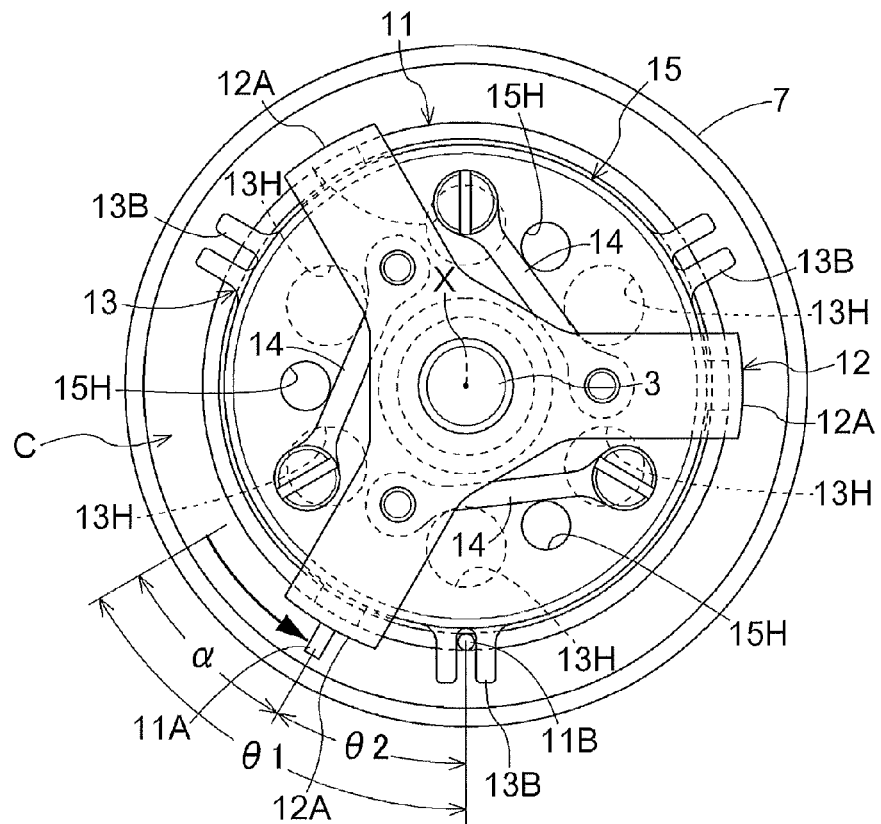
FIG. 6A is a front view of the electromagnetic clutch according to the first embodiment in a state where a driving member rotates by inertia.

The electromagnetic clutch C according to the first embodiment provides the power transmission state, which is the state where the clutch is connected, by providing the wrap spring 11 and the outer peripheral surface 7D of the tubular portion 7B of the driving pulley 7 in the pressure bonding state, which is a state provided by maintaining a relative attitude of the first end 11A of the wrap spring 11 and the second end 11B of the wrap spring 11 at the relative attitude illustrated in FIG. 4A. In the power transmission state, a relative attitude of the driving arms 12A of the driving member 12 and the engaging portion 13B of the operating member 13 is maintained at the attitude illustrated in FIG. 4A. On the contrary, by changing the relative attitude of the first end 11A of the wrap spring 11 and the second end 11B of the wrap spring 11 from the relative attitude illustrated in FIG. 5A to the relative attitude illustrated in FIG. 6A, the wrap spring 11 is operated to twist in a direction where the winding diameter increases. Accordingly, the wrap spring 11 is detached from the tubular portion 7B of the driving pulley 7 to provide the power cutoff state, which is the state where the clutch is disconnected, which is illustrated in FIG. 6A. In the power cutoff state, the relative attitude of the driving arms 12A of the driving member 12 and the engaging portion 13B of the operating member 13 is maintained at the attitude illustrated in FIG. 6A.

The wrap spring 11 may or may not be completely detached from an outer peripheral surface 7D of the tubular portion 7B in order for the electromagnetic clutch C disclosed in this disclosure to provide the power cutoff state. Accordingly, the state of the wrap spring 11 detached from the outer peripheral surface 7D of the tubular portion 7B may or may not be maintained by providing a structure similar to a restraining structure T, which will be described later in this disclosure. The power transmission between the driving pulley 7 and the shaft 3 may be cut off by providing other structures configured to reduce the pressure contact force of the wrap spring 11 that applies to the outer peripheral surface 7D of the tubular portion 7B. In other words, the wrap spring 11 may be in a state where the wrap spring 11 lightly touches the outer peripheral surface 7D of the tubular portion 7B in the power cutoff state.

In the electromagnetic clutch C disclosed in this disclosure, an operational structure is provided with the driving member 12 the operating member 13 and the electromagnetic solenoid S. Upon supplying power to the electromagnetic solenoid S, the restraining structure T brings the driving arms 12A of the driving member 12, and the engaging portion 13B of the operating member 13 to a relative attitude illustrated in FIG. 7A. By maintaining power supply to the electromagnetic solenoid S, the power cutoff state is maintained. An operation of the restraining structure T, which maintains the power cutoff state, will be described next.

The restraining structure T of the electromagnetic clutch according to the first embodiment includes the operating member 13 and the intermediate member 15. As FIGS. 1, 3, and 4A illustrate, the disc form portion 13A of the operating member 13 is formed with a multiple number of primary through-holes 13H formed along a circumferential direction of the operating member 13. The intermediate member 15 is formed with a multiple number of secondary through-holes 15H formed along a circumferential direction of the intermediate member 15. The primary through-holes 13H and the secondary through-holes 15H are configured to bring the driving arms 12A of the driving member 12 and the engaging portion 13B of the operating member 13 to the relative attitude illustrated in FIG. 7A upon operating the electromagnetic clutch C to the power cutoff state. An operation that brings the electromagnetic clutch C to the power cutoff state will be described next. The electromagnetic clutch C according to the first embodiment is provided with three primary through-holes 13H and three secondary through-holes 15H, however, the number of the primary through-holes 13H and the secondary through-holes 15H are not limited to three. The primary through-holes 13H and the secondary through-holes 15H may be provided with appropriate numbers.

Figure 4B:
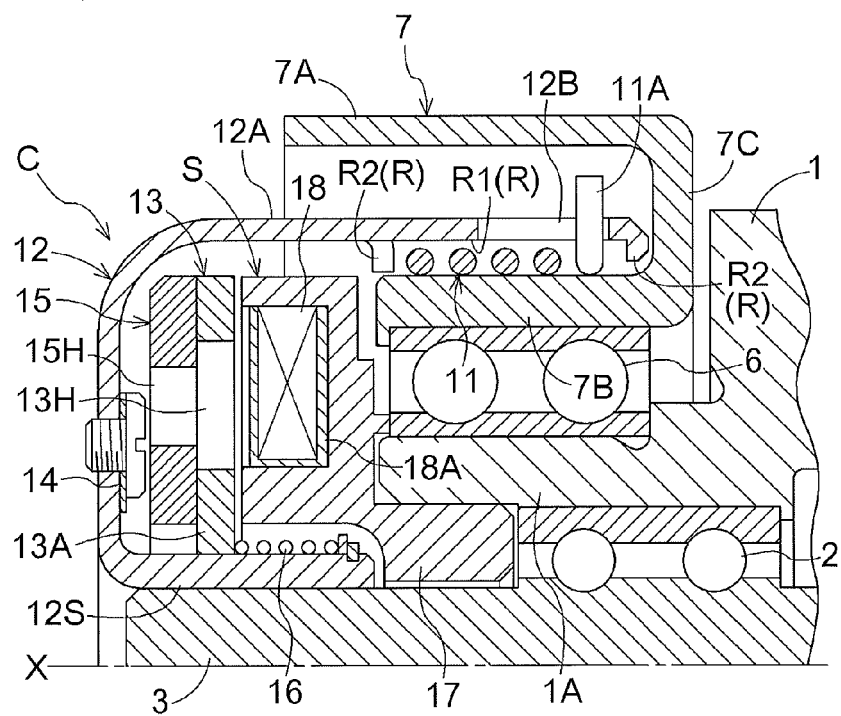
FIG. 4B is a cross sectional view of the electromagnetic clutch according to the first embodiment in a power transmission state.

In a state where the electromagnetic solenoid S is not activated, which is a state where the electricity is not supplied, the operating member 13 is at a position separated from the yoke 17 of the electromagnetic solenoid S by the biasing force of the coil spring 16 as shown in FIG. 4B. In other words, a clearance is available between the operating member 13 and the yoke 17. The wrap spring 11 is attached to the outer peripheral surface 7D of the tubular portion 7B of the driving pulley 7 in a pressure contact state, which is the state provided by the biasing force of the wrap spring 11. The driving arm 12A of the driving member 12 and the engaging portion 13B of the operating member 13 are maintained at the relative attitude illustrated in FIG. 4A. As a result, a rotational driving force is transmitted to the shaft 3 from the driving member 12 that connects to the wrap spring 11, which in turn maintains the electromagnetic clutch C in the power transmission state.

In the power transmission state, a relative angle between the driving arm 12A and the engaging portion 13B is maintained at a power transmission angle θ1. As FIG. 4A illustrates, at the power transmission angle θ1, the secondary through-holes 15H are positioned within the areas of the primary through-holes 13H when viewed in the direction that conforms to the rotation axis X.

Figure 5B:
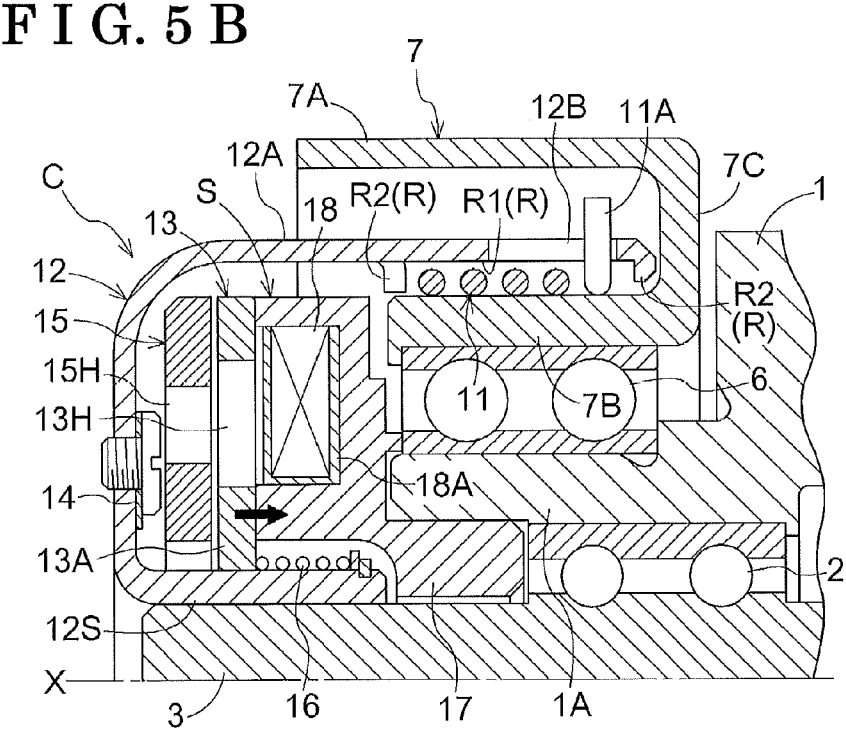
FIG. 5B is a cross sectional view of the electromagnetic clutch according to the first embodiment in the state where the operating member is attracted to contact the electromagnetic solenoid.

Supplying electricity to the coil 18 of the electromagnetic solenoid S switches the electromagnetic solenoid S to an activated state. As FIG. 5B illustrates, the disc form portion 13A of the operating member 13 is attracted to and comes into contact with the electromagnetic solenoid S at the contact surfaces S1 of the yoke 17 being pulled against the biasing force of the coil spring 16. Accordingly, the operating member 13 is restrained from rotating. At the time where the operating member 13 comes into contact with the electromagnetic solenoid S, as shown in FIG. 5A viewed in the direction that conforms to the rotation axis X, the secondary through-holes 15H are at positions within the areas of the primary through-holes 13H. At the positional relation described herewith, the secondary through-holes 15H act as magnetic resistances. Accordingly, the secondary through-holes 15H limit density of magnetic flux that flows from the primary through-holes 13H to the intermediate member 15.

In the electromagnetic clutch C according to the first embodiment, at a time immediately after the electromagnetic solenoid S is switched to the activated state where the density of the magnetic flux is limited, the attraction force from the operating member 13 that acts on the intermediate member 15 is set to be smaller than the biasing force that is applied from three plate springs 14 to the intermediate member 15. Accordingly, the intermediate member 15 is not displaced to a contact state with the operating member 13.

Figure 6B:
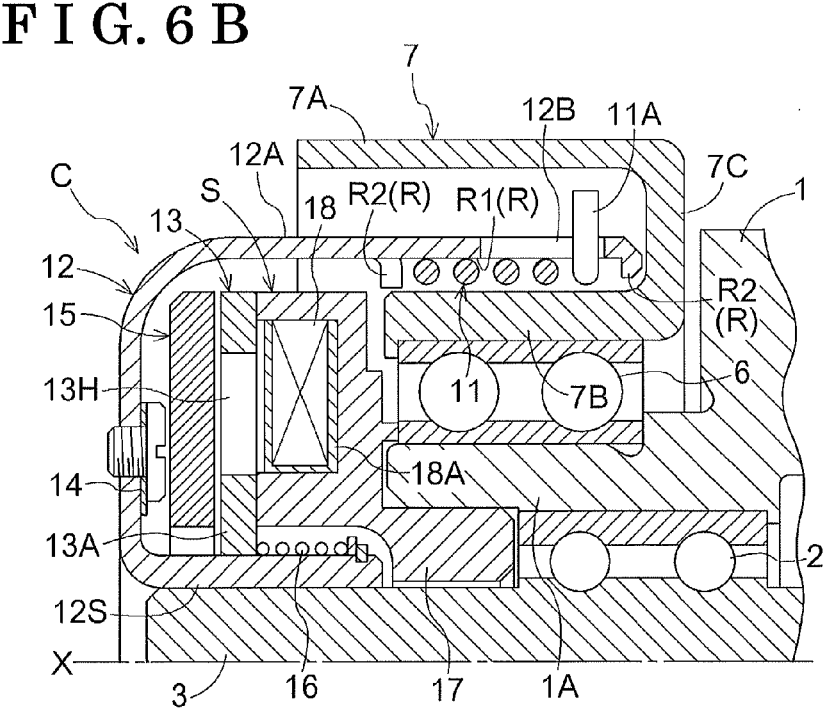
FIG. 6B is a cross sectional view of the electromagnetic clutch according to the first embodiment in the state where the driving member rotates by inertia.

Even after the operating member 13 is restrained from rotating, the driving member 12 continues to rotate in the direction indicated in FIG. 5A with an arrow by inertia. The rotational force described herewith twists the wrap spring 11 to increase the winding diameter of the wrap spring 11, which in turn detaches the wrap spring 11 from the outer peripheral surface 7D of the tubular portion 7B of the driving pulley 7 as FIGS. 6A, 6B illustrate. At an initial time where the driving member 12 starts rotating by inertia, the positions of the secondary through-holes 15H are maintained within the areas of the primary through-holes 13H, when viewed in the direction that conforms to the rotation axis X. Accordingly, the attraction force that applies to the intermediate member 15 is restrained from increasing, so that the intermediate member 15 is not displaced to the contact state with the operating member 13, as shown in FIG. 5B.

Figure 7A:
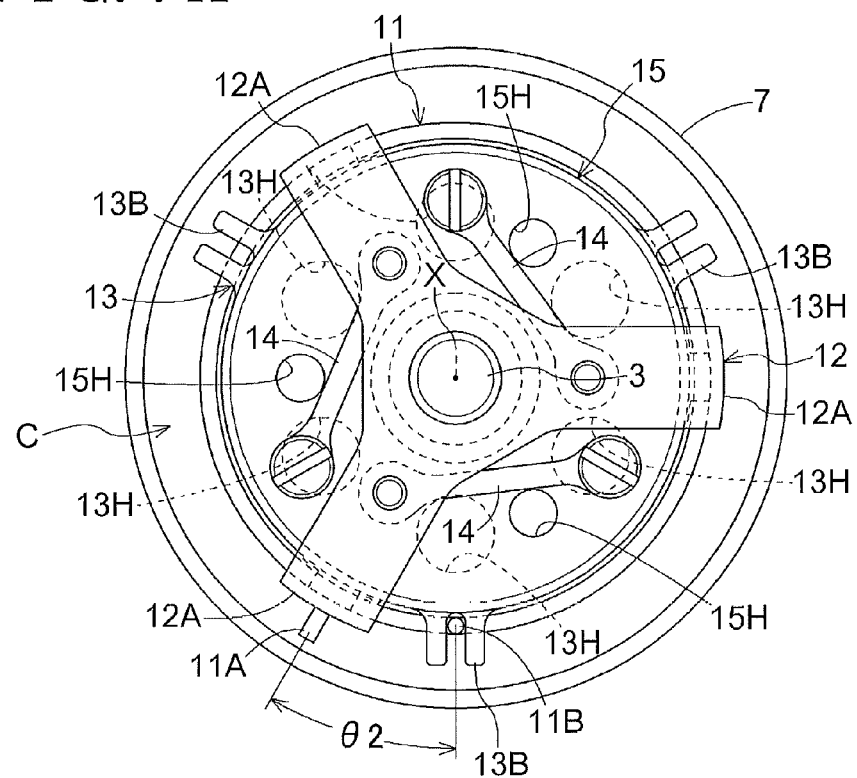
FIG. 7A is a front view of the electromagnetic clutch according to the first embodiment in a state where an intermediate member is in a contact state with the operating member.
Figure 7B:
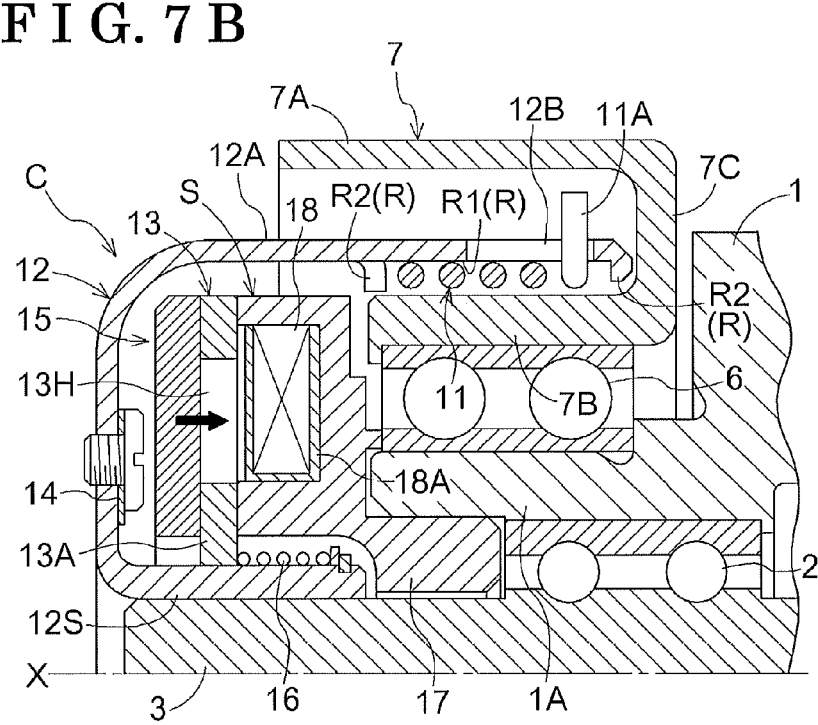
FIG. 7B is a cross sectional view of the electromagnetic clutch according to the first embodiment in the state where the intermediate member is in the contact state with the operating member.

The rotation of the driving member 12 by inertia brings the secondary through-holes 15H to positions outside the areas of the primary through-holes 13H, which is the position on the disc form portion 13A where the through-holes are not provided, when viewed in the direction that conforms to the rotation axis X as shown in FIGS. 6A, 7A. When the relative angle between the driving arms 12A of the driving member 12 and the engaging portion 13B of the operating member 13 reaches a power cutoff angle θ2, the intermediate member 15 moves along the rotation axis X and makes contact with the operating member 13 as FIG. 7B illustrates. At the positional relation described herewith, the magnetic resistance at the area defined by the outer peripheral position of the primary through-holes 13H acting on the intermediate member 15 greatly decreases, which in turn increases the density of the magnetic flux that flows to the intermediate member 15.

Accordingly, the attraction force that acts on the intermediate member 15 becomes larger than the biasing force of three plate springs 14 that applies in the direction for detaching the intermediate member 15 from the operating member 13. As a result, the intermediate member 15 is displaced to the position where the intermediate member 15 makes contact with the operating member 13. At the time at which the relative angle reaches the power cutoff angle θ2, the relative angle of the driving arms 12A is displaced by an amount in accordance with a displacement angle α relative to the engaging portion 13B of the operating member 13.

By the intermediate member 15 making contact with the operating member 13 by attraction, the rotation of the driving member 12 is restrained so that the relative attitude between the driving arms 12A of the driving member 12 and the engaging portion 13B of the operating member 13 is maintained at the attitude illustrated in FIG. 7B against the biasing force of the wrap spring 11. Accordingly, the wrap spring 11 is detached from the outer peripheral surface 7D of the tubular portion 7B of the driving pulley 7 so that the power cutoff state is maintained. In the power cutoff state described herewith, the rotational driving force of the driving pulley 7 is not transmitted to the impeller 4. Accordingly, a water supply from the water pump stops.

At a time at which the electromagnetic solenoid S is activated, which in turn twists the wrap spring 11 so that the wrap spring 11 reaches the state where the wrap spring 11 is detached from the outer peripheral surface 7D of the tubular portion 7B, the first restricting portions R1, which are the driving arms 12A, restrict the displacement of the wrap spring 11 in the direction that increases distance from the rotation axis X or the displacement of the wrap spring 11 in the direction approaching the rotation axis X. At the same time, the second restricting portions R2 restrict the displacement of the wrap spring 11 in the direction that conforms to the rotation axis X. Upon the restrictions described herewith, the wrap spring 11 is restrained at a predetermined position, which is a position in the outward direction of the tubular portion 7B. Accordingly, wearing of the wrap spring 11 as a result of the wrap spring 11 making contact with the tubular portion 7B and consuming unnecessary amount of driving energy is prevented.

In the state where the wrap spring 11 is restrained to a position where the wrap spring 11 is detached from the outer peripheral surface 7D of the tubular portion 7B, deactivating electromagnetic solenoid S results in the intermediate member 15 to detach from the operating member 13 by the biasing force of the plate springs 14 and results in the operating member 13 to detach from the contact surfaces S1 of the yoke 17 by the biasing force of the coil spring 16. Accordingly, the wrap spring 11 is freed from the external force. The biasing force of the wrap spring 11 reduces the winding diameter of the wrap spring 11 so that the wrap spring 11 attaches to the outer peripheral surface 7D of the tubular portion 7B of the driving pulley 7 in the pressure contact state, which brings the electromagnetic clutch C back to the power transmission state.

Effects, or advantages, of the electromagnetic clutch C according to the first embodiment will be described next. The electromagnetic clutch C is configured to transmit power by the wrap spring 11 attaching to the outer peripheral surface 7D of the tubular portion 7B of the driving pulley 7 by pressure bonding. Accordingly, even in a situation where the electromagnetic clutch C is applied to the driving pulley 7 having a different diameter of the belt winding portion 7A due to a specification change, providing the tubular portion 7B having same outer diameter to each of the driving pulley 7 avoids changing the configuration of the electromagnetic clutch C.

The tubular portion 7B is provided with a size to be accommodated within the internal space of the driving pulley 7 so that the size of the electromagnetic clutch C as a whole is made compact. When viewed in a direction orthogonal to the rotation axis X, shaft bearing 2 retaining the shaft 3 at the boss form portion 1A and the pulley bearing 6 retaining the tubular portion 7B of the driving pulley 7 relative to the boss form portion 1A are arranged at an overlapping position. Accordingly, an entire length of the shaft 3 is made shorter and rigidity at the portion retaining the shaft 3 and the tubular portion 7B is increased.

The operating member 13 is formed in a disc form. For example, relative to providing arms extending from an outer periphery of an operating member, the operating member 13 may be reduced in size. Providing smaller size operating member 13 reduces inertia. Accordingly, when electricity is supplied to the electromagnetic solenoid S for disconnecting the electromagnetic clutch C, the operating member 13 makes contact with the contact surfaces S1 swiftly and the rotation by the inertia is further restrained so that a time to reach the state where the clutch is disconnected is made shorter.

In the power cutoff state, the restraining structure T maintains the wrap spring 11 in a predetermined attitude at a position where the wrap spring 11 is detached from the tubular portion, 7B so that the power transmission is reliably cut off. In the power cutoff state, the first restricting portions R1 and the second restricting portions R2 restrict the wrap spring 11 to maintain the position at the position detached from the tubular portion 7B and from changing attitude. Accordingly, the wrap spring 11 and the tubular portion 7B are restrained from wearing, including wearing disproportionately. In the state where the clutch is disconnected, the wrap spring 11 is without contact portions with the tubular portion 7B of the driving pulley 7. Accordingly, a uniform pressure bonding of the wrap spring 11 to the tubular portion 7B of the driving pulley 7 may be provided at the time where the clutch is connected, which results in restraining the driving energy from being unnecessarily consumed.

The electromagnetic clutch C according to other embodiments will be described next. The electromagnetic clutch C according to the first embodiment may be altered to following arrangements. Like parts functioning similarly are designated by the like reference numbers in the electromagnetic clutch C according to the first embodiment and in the electromagnetic clutch C according to other embodiments. Materials used for manufacturing the electromagnetic clutch C according to the first embodiment is used similarly with and the electromagnetic clutch C according to other embodiments.

Figure 8:
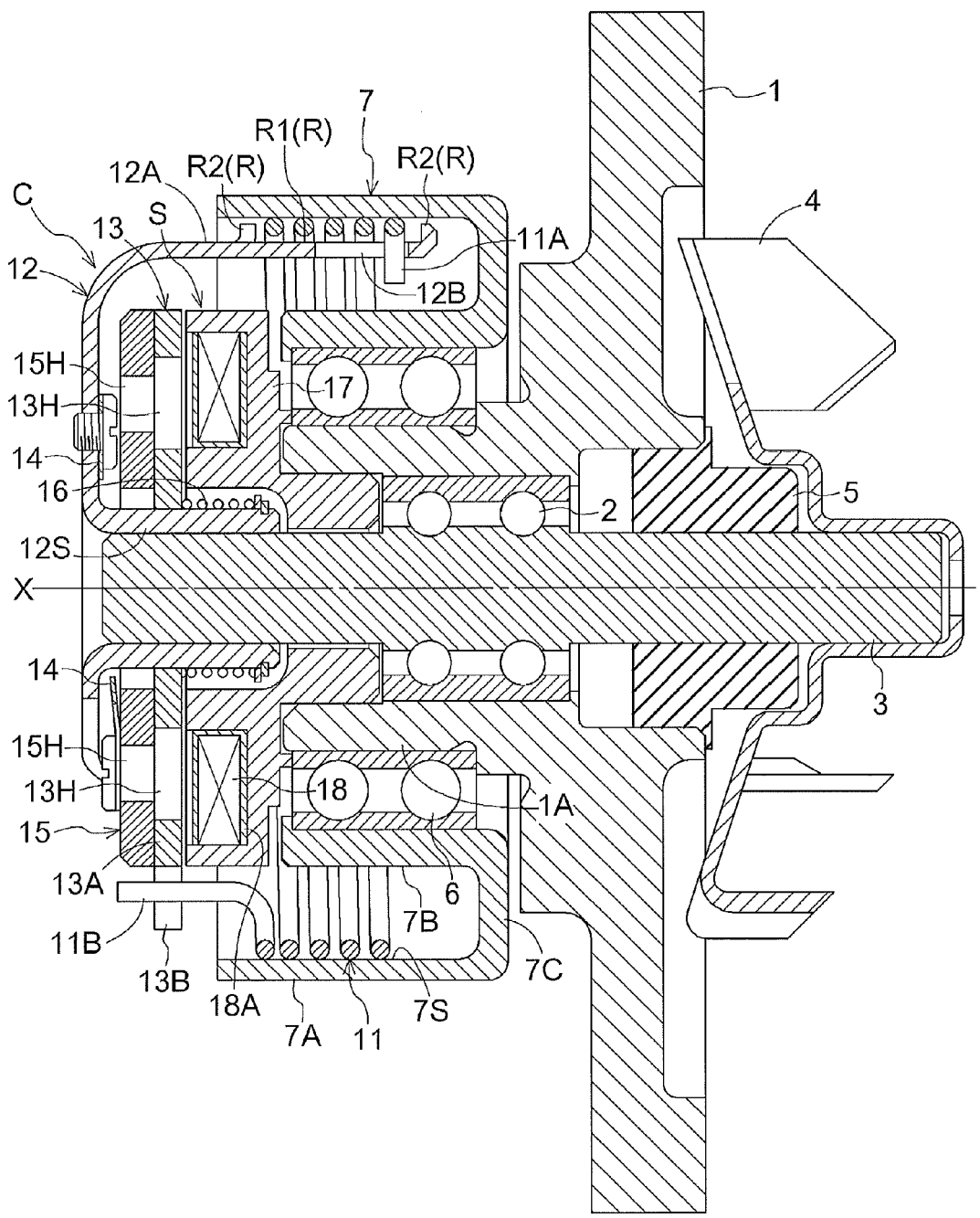
FIG. 8 is a cross sectional view illustrating an electromagnetic clutch according to a second embodiment.

An electromagnetic clutch C according to a second embodiment will be described next. As FIG. 8 illustrates, the electromagnetic clutch C according to the second embodiment applies to a water pump having a similar basic configuration as the water pump that is provided with the electromagnetic clutch C according to the first embodiment. The first embodiment and the second embodiment are different in that, in the second embodiment, a wrap spring 11 is configured to attach to an inner peripheral surface 7S of a driving pulley 7, which serves as the driving-side rotation member, by pressure bonding in order to provide the power transmission state, which is the state where the driving force is transmitted, and the wrap spring 11 is detached from the inner peripheral surface 7S in order to provide the power cutoff state, which is the state where the driving force is cut off.

The wrap spring 11 is formed in the coil form by forming a spring steel in a spiral. The wrap spring 11 is provided with a winding diameter that makes the wrap spring 11 attaches to the inner peripheral surface 7S of the driving pulley 7 by pressure bonding in a normal state, which is a state where no external force is applied on the wrap spring 11. A first end 11A of the wrap spring 11, which is an end of the wrap spring 11 positioned close to the pump housing 1, is bent in a radially inward direction. A second end 11B of the wrap spring 11, which is the other end of the wrap spring 11, is bent outwardly in the axial direction, which is the direction that conforms to a rotation axis X.

The wrap spring 11 is arranged at a position between three driving arms 12A of a driving member 12 and the inner peripheral surface 7S of the driving pulley 7. The wrap spring 11 connects to the driving member 12 in an arrangement where the first end 11A of the wrap spring 11 is inserted into one of slots 12B for engagement formed on each of three driving arms 12A. The wrap spring 11 connects, or engages, to an operating member 13 in an arrangement where the second end 11B of the wrap spring 11 is inserted into one of the recessed portions where the engagement takes place provided on each of three engaging portions 13B that projects outward from the outer periphery of a disc form portion 13A of the operating member 13.

Three driving arms 12A are arranged at a position radially inward of the wrap spring 11, which is at a position in a direction approaching the rotation axis X. Accordingly, the driving arms 12A is configured to function as the first restricting portions R1 restricting the displacement of the wrap spring 11 in the direction that increases distance from the rotation axis X or the displacement of the wrap spring 11 in the direction approaching the rotation axis X. Each of the driving arms 12A is formed with a set of protrusions projecting in a direction of the wrap spring 11, which is a protrusion formed at a distal end in an extending direction of the driving arm 12A and a pair of protrusions formed at a middle portion of the driving arm 12A. The set of protrusions are configured to function as the second restricting portions R2 restricting the displacement of the wrap spring 11 in the direction that conforms to the rotation axis X.

The electromagnetic clutch C according to the second embodiment in a state where an electromagnetic solenoid S is not activated, the wrap spring 11 attaches to the inner peripheral surface 7S of the driving pulley 7 by pressure bonding by the biasing force of the wrap spring 11 so that the electromagnetic clutch C is maintained in the power transmission state. Similarly to the electromagnetic clutch C according to the first embodiment, when a coil 18 of the electromagnetic solenoid S is activated during the power transmission state, the operating member 13 of the electromagnetic clutch C according to the second embodiment makes contact with the contact surfaces 51 so that a rotation of the operating member 13 is restrained. Because of positions of primary through-holes 13H relative to secondary through-holes 15H in the state where the rotation of the operating member 13 is restrained, the driving member 12 and an intermediate member 15 rotate integrally. At a time at which the wrap spring 11 reaches a state where the wrap spring 11 is detached from the inner peripheral surface 7S of the driving pulley 7, because of the positions of the primary through-holes 13H relative to the secondary through-holes 15H, the intermediate member 15 makes contact with the operating member 13 so that the rotation of the intermediate member 15 is restrained, which in turn maintains the electromagnetic clutch C in the power cutoff state.

Because the operating member 13 is formed in the disc form, relative to providing arms extending from an outer periphery of an operating member, the operating member 13 may be reduced in size. Providing smaller size operating member reduces inertia. Accordingly, when electricity is supplied to the electromagnetic solenoid S for disconnecting the electromagnetic clutch C, the operating member 13 makes contact with the contact surfaces S1 swiftly and the rotation by inertia is further restrained so that a time to reach the state where the clutch is disconnected becomes shorter.

Figure 9:
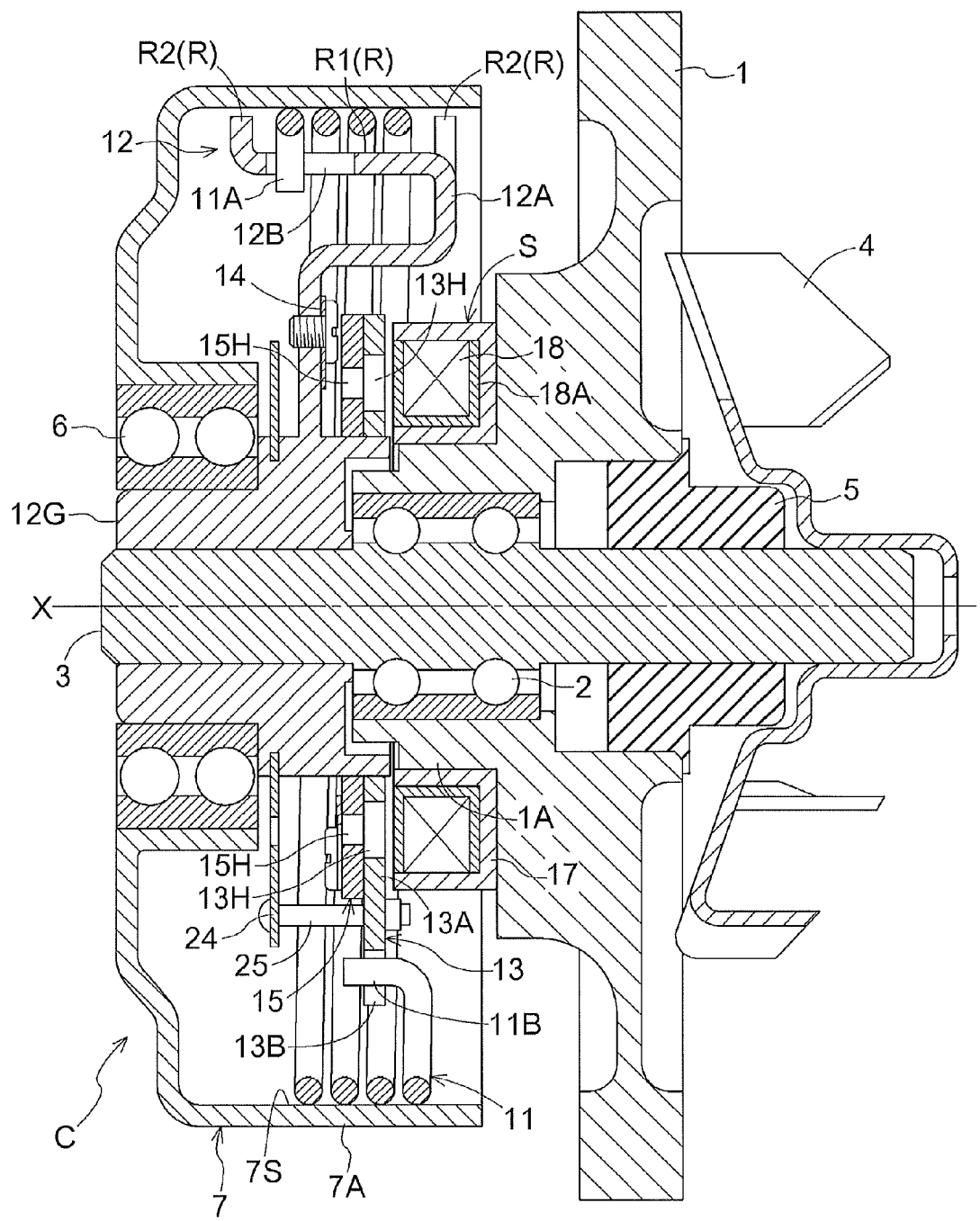
FIG. 9 is a cross sectional view illustrating an electromagnetic clutch according to a third embodiment.

An electromagnetic clutch C according to a third embodiment will be described next. As FIG. 9 illustrates, the electromagnetic clutch C according to the third embodiment applies to a water pump having a different configuration relative to the water pump that is provided with the electromagnetic clutch C according to the first embodiment, different in a configuration for retaining a driving member 12 and with positions where an operating member 13 and an intermediate member 15 are arranged. Similarly to the electromagnetic clutch C according to the second embodiment, the electromagnetic clutch C is configured to provide a power transmission state, a state in which transmits driving forces, by the wrap spring 11 attaching to an inner peripheral surface 7S of a driving pulley 7, which serves as the driving-side rotation member, in a pressure bonding state, and provides the power cutoff state, a state where the driving force is cut off, by canceling the wrap spring 11 from the pressure bonding state relative to the inner peripheral surface 7S of the driving pulley 7.

A boss portion 12G of the driving member 12 is fit and retained to a shaft 3, which serves as the driven-side rotation member, at an outer end of the shaft 3. The driving pulley 7, which serves as the driving-side rotation member, is rotationally supported to the boss portion 12G via a pulley bearing 6 with the center of rotation at a rotation axis X. The boss portion 12G of the driving member 12 is formed with three driving arms 12A with an end portion of each of the driving arms 12A curved to extend parallel to the rotation axis X at a location close to the inner peripheral surface 7S of the driving pulley 7. The operating member 13, which serves as an armature, is loosely fit around the outer periphery of the boss portion 12G in a freely rotatable state with the rotation axis X as the center of rotation and retained thereat in a state where the operating member 13 is movable in the direction along the rotation axis X. The operating member 13 includes a disc form portion 13A. The disc form portion 13A is integrally formed with three engaging portions 13B extending outward about the outer periphery of the disc form portion 13A provided with recessed portions where the engagement takes place.

The wrap spring 11 is arranged at a position outward of three driving arms 12A of the driving member 12, between the driving arms 12A and the inner peripheral surface 7S of the driving pulley 7. The wrap spring 11 connects to the driving member 12 in an arrangement where a first end 11A of the wrap spring 11 is inserted into one of slots 12B for engagement formed on each of three driving arms 12A. The wrap spring 11 connects, or engages, to the operating member 13 in an arrangement where a second end 11B of the wrap spring 11 is inserted into one of three engaging portions 13B.

At a position facing the operating member 13, an electromagnetic solenoid S is arranged on a yoke 17. Around the outer periphery of the boss portion 12G between the operating member 13 and the driving member 12, an intermediate member 15 is loosely fit in a freely rotatable state with the rotation axis X as the center of rotation and retained thereat in a state where the intermediate member 15 is movable in the direction along the rotation axis X. Three plate springs 14 retain the intermediate member 15 to the driving member 12 so that the driving member 12 and the intermediate member 15 rotate integrally and so that the intermediate member 15 is movable in the direction along the rotation axis X. A biasing plate 24 formed from a plate material having a spring characteristic is rotationally supported at an annular groove formed around the outer periphery of the boss portion 12G of the driving member 12 with the rotation axis X as the center of rotation. An outer peripheral portion of the biasing plate 24 is connected to the outer peripheral portion of the operating member 13, connected by a multiple number of operating rods 25.

Three driving arms 12A is arranged at an inwardly positions of the wrap spring 11, which is in a direction approaching the rotation axis X. Accordingly, said three driving arms 12A are configured to serve as first restriction portions R1 restricting the displacement of the wrap spring 11 in the direction that increases distance from the rotation axis X or the displacement of the wrap spring 11 in the direction approaching the rotation axis X. Each of three driving arms 12A is formed with a set of protrusions projecting in a direction of the wrap spring 11, which is a protrusion formed at a distal end in an extending direction of the driving arm 12A and a pair of protrusions formed at a middle portion of the driving arm 12A. The set of protrusions are configured to serve as second restricting portions R2 restricting a displacement of the wrap spring 11 in the direction that conforms to the rotation axis X.

While the electromagnetic clutch C according to the third embodiment is in a state where the electromagnetic solenoid S is not activated, the wrap spring 11 attaches to the inner peripheral surface 7S of the driving pulley 7 by pressure bonding by the biasing force of the wrap spring 11 so that the electromagnetic clutch C is maintained in the power transmission state. Similarly to the electromagnetic clutch C according to the first embodiment, when a coil 18 of the electromagnetic solenoid S is activated during the power transmission state, the operating member 13 makes contact with the contact surfaces S1 of the electromagnetic solenoid S so that a rotation of the operating member 13 is restrained. Because of the positions of primary through-holes 13H relative to secondary through-holes 15H in a state where the rotation of the operating member 13 is restrained, the driving member 12 and the intermediate member 15 rotate integrally. At a time at which the wrap spring 11 reaches a state where the wrap spring 11 is detached from the inner peripheral surface 7S of the driving pulley 7, because of the positions of the primary through-holes 13H relative to the secondary through-holes 15H, the intermediate member 15 makes contact with the operating member 13 so that the rotation of the intermediate member 15 is restrained, which in turn maintains the electromagnetic clutch C in the power cutoff state.

Because the operating member 13 is formed in the disc form, relative to providing arms extending from an outer periphery of the operating member, the operating member 13 may be reduced in size. Providing smaller size operating member reduces inertia. Accordingly, when electricity is supplied to the electromagnetic solenoid S for disconnecting the electromagnetic clutch C, the operating member 13 makes contact with the contact surfaces S1 swiftly and the rotation by inertia is further restrained so that a time to reach the state where the clutch is disconnected becomes shorter.

According to an aspect of this disclosure, the electromagnetic clutch C includes the driving pulley 7 rotating about the rotation axis X as the center by receiving the driving force, the shaft 3 coaxially arranged with the rotation axis X, the wrap spring 11 being wound around to be in the pressure bonding state relative to the driving pulley 7 in the normal state, the driving member 12 fixed to the shaft 3 connected with the first end 11A of the wrap spring 11, the operating member 13 made from a magnetic body rotatable relative to the shaft 3 about the rotation axis X as the center, movable along the rotation axis X, including the disc form portion 13A formed in the disc form provided with the rim portion 13C where the second end 11B of the wrap spring 11 connects to, and the electromagnetic solenoid S configured to generate the magnetic force attracting and retaining the operating member 13. At a time at which electricity is supplied to the electromagnetic solenoid S, which in turn attracts and retains the operating member 13 to the electromagnetic solenoid S, the driving member 12 rotates relative to the operating member 13 by a frictional force generated between the driving member 12 and the driving pulley 7 or by inertia, which in turn cancels the wrap spring 11 from the pressure boding state with the driving pulley 7 to disconnect power transmission from the driving pulley 7 to the shaft 3.

Upon the arrangement described herewith, in a state where the electromagnetic solenoid S is not supplied with electricity, the wrap spring 11 attaches to the driving pulley 7 by pressure bonding so that the power transmission state is provided. The power transmission state is the state where the clutch is connected, which is the state where the rotational power of the driving pulley 7 is transmitted from the driving member 12 that connects to the first end 11A of the wrap spring 11 to the shaft 3. In a state where the electromagnetic solenoid S is supplied with electricity, the operating member 13 that connects to the second end 11B of the wrap spring 11 is attracted and connects to the electromagnetic solenoid S so that the rotation is interrupted. After the rotation of the operating member 13 is interrupted, the driving member 12 rotates relative to the operating member 13 by inertia. The driving member 12 rotating relative to the operating member 13 twists the wrap spring 11 such that the wrap spring 11 is cancelled from the pressure bonding state relative to the driving pulley 7. The motive power from the driving pulley 7 to the shaft 3 is cut off in order to provide the power cutoff state, which is the state where the clutch is disconnected. Relative to providing arms extending from an outer periphery of an operating member, the operating member 13 in this disclosure is formed in the disc form and the wrap spring 11 engages to the rim portion 13C of the operating member 13. Accordingly, inertia at the time when the operating member 13 comes into contact with the electromagnetic solenoid S in a state where the electromagnetic solenoid S is supplied with electricity is small, which results in swiftly stopping the operating member 13 from rotating. In addition, inertia at the time the operating member 13 starts rotating is also reduced. Accordingly, when the electricity supply to the electromagnetic solenoid S is cut off during the power cutoff state, a time to reach the operating member 13 to start the rotation becomes shorter, the rotation as a result of the wrap spring 11 changing form into the pressure bonding state to provide the biasing force that makes the operating member 13 starts rotating. As a result, the electromagnetic clutch C swiftly switches between the power transmission state and the power cutoff state by switching the state of the wrap spring 11 between the pressure bonding state and the state where the pressure bonding is cancelled by using the electromagnetic solenoid S.

According to another aspect of this disclosure, the electromagnetic solenoid S of the electromagnetic clutch C includes the contact surface S1 formed in a ring form with the rotation axis X as the center. The operating member 13 is provided with the outer diameter that covers the contact surface S1.

Accordingly, the magnetic flux from the electromagnetic solenoid S economically acts on the operating member 13 from the contact surface S1, which makes the attraction and contact of the operating member 13 swift, so that the power cutoff state is provided instantaneously.

According to further aspect of this disclosure, the operating member 13 of the electromagnetic clutch C is provided with the engaging portion 13B formed on the outer periphery of the operating member 13. The operating member 13 and the second end 11B of the wrap spring 11 is connected in an arrangement where the second end 11B of the wrap spring 11 is inserted into the engaging portion 13B.

Upon the arrangement described herewith, the wrap spring 11 connects to the operating member 13 in the arrangement where the second end 11B of the wrap spring 11 is inserted into the engaging portion 13B. Accordingly, the connection between the wrap spring 11 and the operating member 13 is provided with a simple configuration.

According to another aspect of this disclosure, the driving pulley 7 of the electromagnetic clutch C is integrally formed with the tubular portion 7B at a central portion of the driving pulley 7 with the rotation axis X as the center. The wrap spring 11 is arranged at a position where the wrap spring 11 attaches to the outer peripheral surface 7D of the tubular portion 7B by pressure bonding.

Upon the arrangement described herewith, the power transmission state is provided by the wrap spring 11 that attaches to the tubular portion 7B by pressure bonding in the state where the electromagnetic solenoid S is not supplied with electricity. By supplying electricity to the electromagnetic solenoid S, the wrap spring 11 is operated to twist, which in turn cancels the pressure bonding state of the wrap spring 11 relative to the outer peripheral surface 7D of the tubular portion 7B, so that the power cutoff state is provided. The wrap spring 11 used is provided with the winding diameter that is configured to attach to the outer peripheral surface 7D of the tubular portion 7B by pressure bonding. The tubular portion 7B is a portion at a position toward the center of the driving pulley 7. Accordingly, a wrap spring having a small winding diameter may be used. Even in a situation where the electromagnetic clutch C is to be provided with a driving pulley having a different radius of the belt winding portion by a specification change, providing the tubular portion 7B provided with the same outer peripheral size avoids changing the configuration of the electromagnetic clutch C when the driving pulley 7 is changed.

According to further aspect of this disclosure, the driving pulley 7 of the electromagnetic clutch C is formed with the inner peripheral surface 7S formed in a cylinder form. The wrap spring 11 is arranged at the position where the wrap spring 11 attaches to the inner peripheral surface 7S by pressure bonding.

The power transmission state is provided in a state where the wrap spring 11 is attached to the inner peripheral surface 7S of the driving pulley 7 by pressure bonding in the state where the electromagnetic solenoid S is not supplied with electricity. By supplying electricity to the electromagnetic solenoid S, the wrap spring 11 is operated to twist, which in turn cancels the pressure bonding state of the wrap spring 11 relative to the inner peripheral surface 7S of the driving pulley 7, so that the power cutoff state is provided. The inner peripheral surface 7S where the wrap spring 11 is arranged to attach to by pressure bonding, is a portion having a relatively wide area so that a reliability of power transmission may be enhanced.

According to further aspect of this disclosure, the electromagnetic clutch C further includes the restricting portion R provided on the driving member 12 for retaining the wrap spring 11 in a state where the wrap spring 11 is pressed against the restricting portion R while the operating member 13 is attracted and retained to the electromagnetic solenoid S.

In the power cutoff state, the wrap spring 11 is pressed against the restricting portion R, so that a state where the wrap spring 11 partially makes contact with the driving pulley 7 is restrained. Accordingly, a disadvantage of a certain portion of the wrap spring 11 and a certain portion of the driving pulley 7 wearing down to a large amount is avoided. As a result, the electromagnetic clutch C, which provides the power transmission state and the power cutoff state by switching the state of the wrap spring 11 between the pressure boding state and the state where the pressure bonding state is cancelled by using the electromagnetic solenoid S, is provided with the electromagnetic clutch C resolved of the disadvantage of certain portions of the wrap spring 11 and the driving pulley 7 wearing down.

According to further aspect of this disclosure, the restricting portion R of the electromagnetic clutch C includes the first restricting portion R1 restricting the displacement of the wrap spring 11 in the radial direction relative to the center of the rotation axis X.

Upon the arrangement described herewith, the first restricting portion R1 resolves a disadvantage of a displacement of the wrap spring 11 in the radial direction during the power cutoff state, the displacement which may cause the wrap spring 11 and the driving pulley 7 making strong contact with each other and wearing down unevenly.

According to further aspect of this disclosure, the restricting portion R of the electromagnetic clutch C includes the second restricting portion R2 restricting the displacement of the wrap spring 11 in the direction along the rotation axis X.

Upon the arrangement described herewith, the second restricting portion R2 resolves a disadvantage of a displacement of the wrap spring 11 in the direction along the rotation axis X during the power cutoff state. The second restricting portion R2 maintains the attitude of the wrap spring 11 in a stable state, and restrains the wearing down of the wrap spring 11 unevenly.

According to further aspect of this disclosure, the electromagnetic clutch C further includes the intermediate member 15 made from a magnetic body provided at the position opposite side of where the electromagnetic solenoid S is arranged relative to the operating member 13, integrally rotates with the shaft 3 and movable in the direction along the rotation axis X, and the restraining structure T structured by the operating member 13 and the intermediate member 15, the restraining structure T including the primary through-hole 13H extending through the operating member 13 and provided on the surface of the operating member 13 where the electromagnetic solenoid C makes contact and the secondary through-hole 15H extending through the intermediate member 15 and provided on the surface of the intermediate member 15 where the magnetic flux from the operating member 13 acts on. The restraining structure T is provided with the primary through-hole 13H and the secondary through-hole 15H arranged in a positional relationship configured to allow a rotation of the driving member 12 by inertia after the operating member 13 is attracted to contact the electromagnetic solenoid S by activating the electromagnetic solenoid S, to increase the attraction force that acts on the intermediate member 15 at a time at which the operating member 13 and the intermediate member 15 reach a rotational phase that cancels the wrap spring 11 from the pressure bonding state with the driving pulley 7, and to restrain the rotation of the driving member 12 by attracting the intermediate member 15 to contact the operating member 13 by the attraction force that acts on the intermediate member 15.

Upon the arrangement described herewith, in a state where the operating member 13 is attracted and connects to the electromagnetic solenoid S, the magnetic flux leaked from the primary through-hole 13H that extends through the operating member 13 may be provided to act on the intermediate member 15. The intermediate member 15 is provided with the secondary through-hole 15H. At the portion where the secondary through-hole 15H is provided, the magnetic resistance is increased and the attraction force is decreased. At the portion where the secondary through-hole 15H is not provided, the magnetic resistance is small so that the attraction force may be increased. When the electromagnetic solenoid S is supplied with electricity and after the operating member 13 is attracted to and contacts the electromagnetic solenoid S, the attraction force that acts on the intermediate member 15 from the operating member 13 is limited at an initial state of the rotation of the driving member 12 by inertia. The attraction force that acts on the intermediate member 15 is increased when the rotational phase reaches a state where the power from the driving pulley 7 is cut off, so that the intermediate member 15 is attracted to contact with the operating member 13, which restrains the wrap spring 11 in a state where the wrap spring 11 is detached from the tubular portion 7B. As a result, the power cutoff state where the driving pulley 7 and the shaft 3 unintentionally rotating integrally is reliably avoided.

According to another aspect of this disclosure, the electromagnetic clutch C includes the driving pulley 7 rotating about the rotation axis X as the center by receiving the driving force, the shaft 3 coaxially arranged with the rotation axis X, the wrap spring 11 being wound around to be in the pressure bonding state relative to the driving pulley 7 in the normal state, the driving member 12 fixed to the shaft 3 connected with the first end 11A of the wrap spring 11, the operating member 13 made from a magnetic body in the state where the second end 11B of the wrap spring 11 is connected, rotatable relative to the shaft 3 with the rotation axis X as the center and movable along the rotation axis X, the electromagnetic solenoid S configured to generate the magnetic force attracting and retaining the operating member 13, and the restricting portion R provided on the driving member 12 configured to retain the wrap spring 11 in the state where the wrap spring 11 is pressed against the restricting portion R while the operating member 13 is attracted to contact and retained to the electromagnetic solenoid S. At the time at which electricity is supplied to the electromagnetic solenoid S, which in turn attracts and retains the operating member 13 to the electromagnetic solenoid S, the driving member 12 rotates relative to the operating member 13 by the frictional force generated between the driving member 12 and the driving pulley 7 or by inertia, which in turn cancels the wrap spring 11 from the pressure boding state relative to the driving pulley 7 to disconnect power transmission from the driving pulley 7 to the shaft 3.

Upon the arrangement described herewith, in the state where the electromagnetic solenoid S is not supplied with electricity, the wrap spring 11 attaches to the driving pulley 7 by pressure bonding so that the power transmission state is provided. The power transmission state is the state where the clutch is connected, which is the state where the rotational power of the driving pulley 7 is transmitted from the driving member 12 that connects to the first end 11A of the wrap spring 11 to the shaft 3. In the state where the electromagnetic solenoid S is supplied with electricity, the operating member 13 that connects to the second end 11B of the wrap spring 11 is attracted and connects to the electromagnetic solenoid S so that the rotation is interrupted. After the rotation of the operating member 13 is interrupted, the driving member 12 rotates relative to operating member 13 by inertia. The driving member 12 rotating relative to the operating member 13 twists the wrap spring 11 such that the wrap spring 11 is cancelled from the pressure bonding state relative to the driving pulley 7. The motive power from the driving pulley 7 to the shaft 3 is cut off in order to provide the power cutoff state, which is the state where the clutch is disconnected. Relative to providing arms extending from an outer periphery of an operating member, the operating member 13 in this disclosure is formed in the disc form and the wrap spring 11 engages to the rim portion 13C of the operating member 13. Accordingly, inertia at the time at which the operating member 13 comes into contact with the electromagnetic solenoid S in the state where the electromagnetic solenoid S is supplied with electricity is small, which results in swiftly stopping the operating member 13 from rotating. In addition, inertia at the time the operating member 13 starts rotating is also reduced. Accordingly, when the electricity supply to the electromagnetic solenoid S is cut off during the power cutoff state, a time to reach the operating member 13 to start the rotation becomes shorter, the rotation as a result of the wrap spring 11 changing form into the pressure bonding state to provide the biasing force that makes the operating member 13 starts start rotating. As a result, the electromagnetic clutch C swiftly switches between the power transmission state and the power cutoff state by switching the state of the wrap spring 11 between the pressure bonding state and the state where the pressure bonding is cancelled by using the electromagnetic solenoid S. In the power cutoff state, the wrap spring 11 is pressed against the restricting portion R, so that the state where the wrap spring 11 partially making contact with the driving pulley 7 is restrained. Accordingly, a disadvantage of a certain portion of the wrap spring 11 and a certain portion of the driving pulley 7 wearing down to a large amount is avoided. As a result, the electromagnetic clutch C, which provides the power transmission state and the power cutoff state by switching the state of the wrap spring 11 between the pressure boding state and the state where the pressure bonding state is cancelled by using the electromagnetic solenoid S, is provided with the electromagnetic clutch C without the disadvantage of certain portions of the wrap spring 11 and the driving pulley 7 wearing down.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. An electromagnetic clutch, comprising:
a driving-side rotation member rotating about a rotation axis as a center by receiving a driving force;
a driven-side rotation member coaxially arranged with the rotation axis;
a wrap spring being wound around to be in a pressure bonding state relative to the driving-side rotation member in a normal state;
a driving member fixed to the driven-side rotation member, connected with a first end of the wrap spring;
an operating member made from a magnetic body rotatable relative to the driven-side rotation member about the rotation axis as the center, movable along the rotation axis, including a disc form member formed in a disc form provided with a rim portion where a second end of the wrap spring connects to;
an electromagnetic solenoid configured to generate a magnetic force attracting and retaining the operating member, wherein
at a time at which electricity is supplied to the electromagnetic solenoid, which in turn attracts and retains the operating member to the electromagnetic solenoid, the driving member rotates relative to the operating member by a frictional force generated between the driving member and the driving-side rotation member or by inertia, which in turn cancels the wrap spring from the pressure boding state relative to the driving-side rotation member to disconnect power transmission from the driving-side rotation member to the driven-side rotation member;
an intermediate member made from a magnetic body provided at a position opposite side of where the electromagnetic solenoid is arranged relative to the operating member, rotates relative to the driven-side rotation member and movable in a direction along the rotation axis;
a restraining structure structured by the operating member and the intermediate member, the restraining structure including a primary through-hole extending through the operating member and provided on a surface of the operating member where the electromagnetic solenoid makes contact and a secondary through-hole extending through the intermediate member and provided on a surface of the intermediate member where a magnetic flux from the operating member acts on; and wherein
the restraining structure is provided with the primary through-hole and the secondary through-hole arranged in a positional relationship configured to allow a rotation of the driving member by inertia after the operating member is attracted to contact the electromagnetic solenoid by activating the electromagnetic solenoid, to increase an attraction force that acts on the intermediate member at a time at which the operating member and the intermediate member reach a rotational phase that cancels the wrap spring from the pressure bonding state with the driving-side rotation member, and to restrain the rotation of the driving member by attracting the intermediate member to contact the operating member by the attraction force that acts on the intermediate member.

2. The electromagnetic clutch according to claim 1, wherein the electromagnetic solenoid includes a contact surface formed in a ring form with the rotation axis as the center, and wherein the operating member is provided with an outer diameter that covers the contact surface.

3. The electromagnetic clutch according to claim 2, wherein the operating member is provided with an engaging portion formed on an outer periphery of the operating member, and wherein the operating member and the second end of the wrap spring is connected in an arrangement where the second end of the wrap spring is inserted into the engaging portion.

4. The electromagnetic clutch according to claim 2, wherein the driving-side rotation member is integrally formed with a tubular portion at a central portion of the driving-side rotation member with the rotation axis as the center, and wherein the wrap spring is arranged at a position where the wrap spring attaches to an outer peripheral surface of the tubular portion by pressure bonding.

5. The electromagnetic clutch according to claim 2, wherein the driving-side rotation member is formed with an inner peripheral surface formed in a cylinder form, and wherein the wrap spring is arranged at a position where the wrap spring attaches to the inner peripheral surface by pressure bonding.

6. The electromagnetic clutch according to claim 1, wherein the operating member is provided with an engaging portion formed on an outer periphery of the operating member, and wherein the operating member and the second end of the wrap spring is connected in an arrangement where the second end of the wrap spring is inserted into the engaging portion.

7. The electromagnetic clutch according to claim 6, wherein the driving-side rotation member is integrally formed with a tubular portion at a central portion of the driving-side rotation member with the rotation axis as the center, and wherein the wrap spring is arranged at a position where the wrap spring attaches to an outer peripheral surface of the tubular portion by pressure bonding.

8. The electromagnetic clutch according to claim 6, wherein the driving-side rotation member is formed with an inner peripheral surface formed in a cylinder form, and wherein the wrap spring is arranged at a position where the wrap spring attaches to the inner peripheral surface by pressure bonding.

9. The electromagnetic clutch according to claim 1, wherein the driving-side rotation member is integrally formed with a tubular portion at a central portion of the driving-side rotation member with the rotation axis as the center, and wherein the wrap spring is arranged at a position where the wrap spring attaches to an outer peripheral surface of the tubular portion by pressure bonding.

10. The electromagnetic clutch according to claim 1, wherein the driving-side rotation member is formed with an inner peripheral surface formed in a cylinder form, and wherein the wrap spring is arranged at a position where the wrap spring attaches to the inner peripheral surface by pressure bonding.

11. The electromagnetic clutch according to claim 1, further comprising:
    a spring retaining portion provided on the driving member for retaining the wrap spring in a state where the wrap spring is pressed against the spring retaining portion while the operating member is attracted and retained to the electromagnetic solenoid.

12. The electromagnetic clutch according to claim 11, wherein the spring retaining portion includes a first retaining portion restricting a displacement of the wrap spring in a radial direction relative to the center of the rotation axis.

13. The electromagnetic clutch according to claim 12, wherein the spring retaining portion includes a second retaining portion restricting a displacement of the wrap spring in a direction along the rotation axis.

14. The electromagnetic clutch according to claim 11, wherein the spring retaining portion includes a second retaining portion restricting a displacement of the wrap spring in a direction along the rotation axis.

15. An electromagnetic clutch, comprising:
    a driving-side rotation member rotating about a rotation axis as a center by receiving a driving force;
    a driven-side rotation member coaxially arranged with the rotation axis;
    a wrap spring being wound around to be in a pressure bonding state relative to the driving-side rotation member in a normal state;
    a driving member fixed to the driven-side rotation member connected with a first end of the wrap spring;
    an operating member made from a magnetic body in a state where a second end of the wrap spring is connected, rotatable relative to the driven-side rotation member with the rotation axis as the center and movable along the rotation axis;
    an electromagnetic solenoid configured to generate a magnetic force attracting and retaining the operating member;
    a spring retaining portion provided on the driving member configured to retain the wrap spring in a state where the wrap spring is pressed against the spring retaining portion while the operating member is attracted to contact and retained to the electromagnetic solenoid, wherein
    at a time at which electricity is supplied to the electromagnetic solenoid, which in turn attracts and retains the operating member to the electromagnetic solenoid, the driving member rotates relative to the operating member by a frictional force generated between the driving member and the driving-side rotation member or by inertia, which in turn cancels the wrap spring from the pressure boding state relative to the driving-side rotation member to disconnect power transmission from the driving-side rotation member to the driven-side rotation member;
    an intermediate member made from a magnetic body provided at a position opposite side of where the electromagnetic solenoid is arranged relative to the operating member, rotates relative to the driven-side rotation member and movable in a direction along the rotation axis;
    a restraining structure structured by the operating member and the intermediate member, the restraining structure including a primary through-hole extending through the operating member and provided on a surface of the operating member where the electromagnetic solenoid makes contact and a secondary through-hole extending through the intermediate member and provided on a surface of the intermediate member where a magnetic flux from the operating member acts on; and wherein
    the restraining structure is provided with the primary through-hole and the secondary through-hole arranged in a positional relationship configured to allow a rotation of the driving member by inertia after the operating member is attracted to contact the electromagnetic solenoid by activating the electromagnetic solenoid, to increase an attraction force that acts on the intermediate member at a time at which the operating member and the intermediate member reach a rotational phase that cancels the wrap spring from the pressure bonding state with the driving-side rotation member, and to restrain the rotation of the driving member by attracting the intermediate member to contact the operating member by the attraction force that acts on the intermediate member.

16. An electromagnetic clutch, comprising:
    a driving-side rotation member rotating about a rotation axis as a center by receiving a driving force;
    a driven-side rotation member coaxially arranged with the rotation axis;
    a wrap spring being wound around to be in a pressure bonding state relative to the driving-side rotation member in a normal state;

a driving member fixed to the driven-side rotation member, connected with a first end of the wrap spring;

an operating member made from a magnetic body rotatable relative to the driven-side rotation member about the rotation axis as the center, movable along the rotation axis, including a disc form member formed in a disc form provided with a rim portion where a second end of the wrap spring connects to;

an electromagnetic solenoid configured to generate a magnetic force attracting and retaining the operating member;

wherein at a time at which electricity is supplied to the electromagnetic solenoid, which in turn attracts and retains the operating member to the electromagnetic solenoid, the driving member rotates relative to the operating member by a frictional force generated between the driving member and the driving-side rotation member or by inertia, which in turn cancels the wrap spring from the pressure boding state relative to the driving-side rotation member to disconnect power transmission from the driving-side rotation member to the driven-side rotation member; and wherein the driving-side rotation member is integrally formed with a tubular portion at a central portion of the driving-side rotation member with the rotation axis as the center, and wherein the wrap spring is arranged at a position where the wrap spring attaches to an outer peripheral surface of the tubular portion by pressure bonding.

* * * * *